Figures 1, 2:
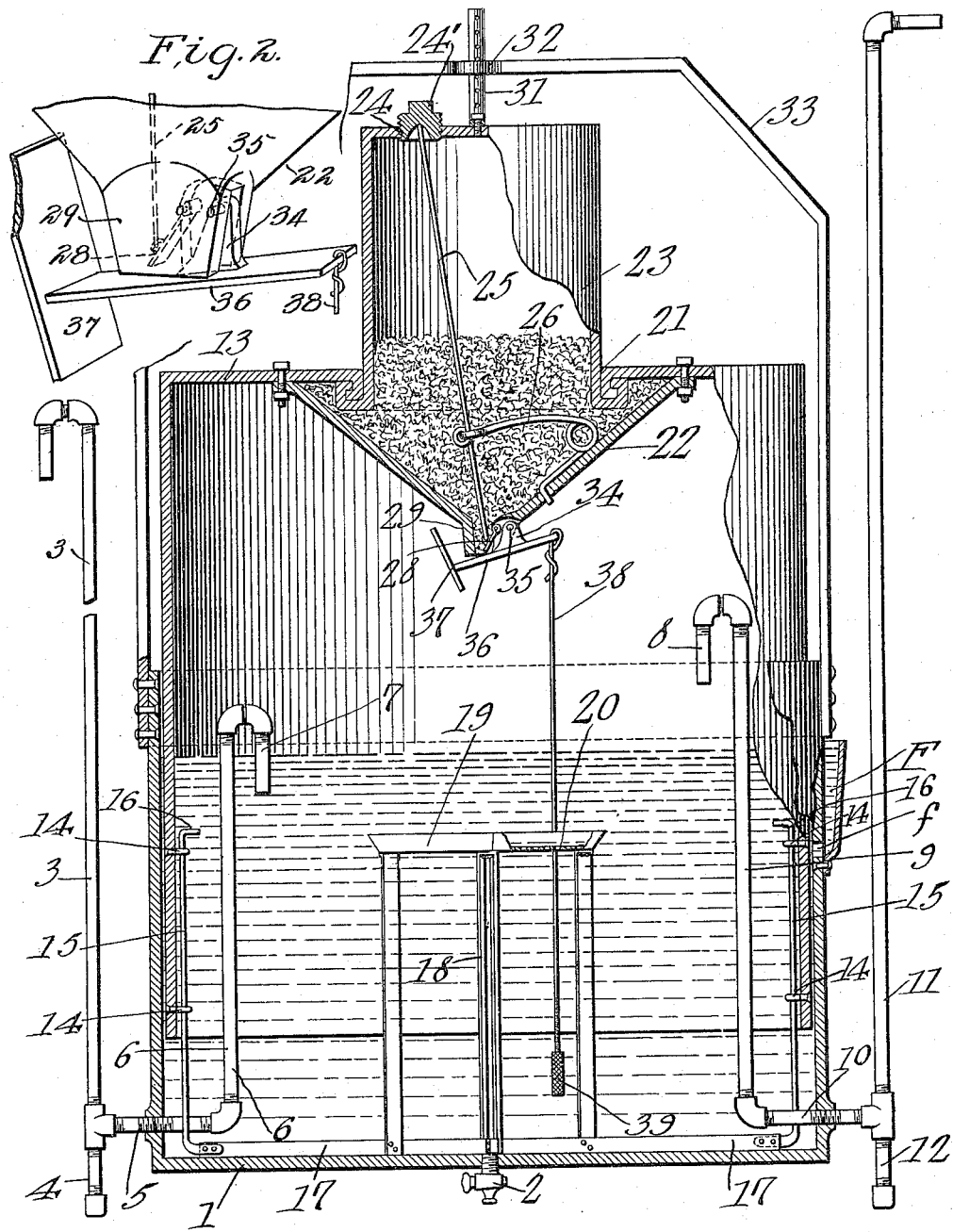

E. M. RODEBAUGH.
ACETYLENE GAS GENERATOR.
APPLICATION FILED MAR. 27, 1914.

1,156,495.

Patented Oct. 12, 1915.

Witnesses

E. M. Rodebaugh
Inventor by

Attorneys

UNITED STATES PATENT OFFICE.

ERNEST M. RODEBAUGH, OF LONG BOTTOM, OHIO.

ACETYLENE-GAS GENERATOR.

1,156,495.  Specification of Letters Patent.  Patented Oct. 12, 1915.

Application filed March 27, 1914. Serial No. 827,697.

*To all whom it may concern:*

Be it known that I, ERNEST M. RODEBAUGH, a citizen of the United States, residing at Long Bottom, in the county of Meigs and State of Ohio, have invented a new and useful Acetylene-Gas Generator, of which the following is a specification.

The present invention relates to improvements in acetylene gas generators, one object of the invention being the provision of a generator of simple construction, in which the parts are arranged for ready accessibility and for easy cleaning, there being provided a gas bell which carries bodily therewith a carbid holder and a sludge agitator, whereby the apparatus is made compact and easily cleaned.

A still further object of the present invention is the provision of an acetylene gas generator, wherein the sludge may be properly cleaned and expelled therefrom when necessary.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings: Figure 1 is a vertical central sectional view through the complete generator. Fig. 2 is a perspective view upon a larger scale of the carbid outlet of the carbid holder or hopper with the adjacent parts thereof.

Referring to the drawings, the numeral 1 designates the main receptacle which is an open ended receptacle, and is provided with a sludge drain 2. A pressure relief pipe 3 having an extension 4 at the lower end thereof for receiving condensation is provided and is led by the short pipe 5 and the vertical pipe 6 within the generator chamber 1, the inlet end 7 being projected to extend below the level of the water within the same so that no gas is permitted to pass through the pipe 3. By this means any undue pressure within the generator will be relieved.

Disposed at a substantially diametrical point to the pipe 3 is the gas directing pipe 11, the inlet end 8 of which is disposed within the generating chamber and extended downwardly to receive the generated gas to direct the same through the vertical pipe 9 and the short horizontal pipe 10 which is seated within the wall of the chamber 1 to the outlet supplying pipe 11, there being disposed a condensate receiving cap or pipe 12 below the pipe 10 and in alinement with the pipe 11.

The bell 13 is disposed telescopically within the member 1 to be raised and lowered due to the increased and decreased volume of gas generated and is provided with a plurality of guiding eyes 14 in which are adapted to fit the rods 15, the upper ends of which are hooked as at 16 while the lower ends are connected to the blades 17 of the sludge stirring member. Thus the sludge stirring member 17 remains substantially at the bottom of the generator chamber 1 during the lowering and elevating of the bell 13, yet is in such a position that when the bell is oscillated, the same will stir the water and the sludge within the water, so that the water and sludge may be drained through the valved outlet 2. Connected to and carried by the sludge member 17 are the upright members 18 which carry the receptacle 19 provided with the foraminous or screen bottom 20. This receptacle 19 is disposed concentrically of the bell and chamber 1 to receive the lump carbid as the same is dropped thereupon and as the receptacle 19 is disposed below the water level, the carbid is retained therein during saturation and disintegration due to the effect of the water thereupon.

An opening 21 is provided concentrically of the bell 13 at the top thereof and fitting thereunder is the funnel shaped end 22 which coöperates with the carbid receptacle 23. The funnel is therefore disposed to project within the bell 13, the outlet end 20 being disposed concentrically above the cleaning member 19 so that the carbid ejected therefrom will be directed upon the screen bottom of the member 19. A filling opening 24 is provided in the top of the receptacle 23 and is controlled by a screw plug 24′.

A valve actuating rod 25 is disposed within the carbid holder 23 so that its upper end by means of the spring 26 is held in engagement with the under side of the plug 24′ which acts as a means for limiting the upward movement of the rod, the removal of the plug 24′ permitting the rod to be moved upwardly by the spring 26. Thus the pivoted closure 28 is elevated and closes the spout 29 during the filling of the receptacle 23 with carbid. Then when the cap 24' is placed in position, the rod 25 is depressed and the closure 28 assumes the position as shown in the drawings, so that the carbid may be directed through the spout 29 into the generating chamber.

During the filling of the carbid holder receptacle 23, it is essential that the bell 13 be maintained in a stationary position and in order to permit this, a frame 33 is provided and is connected to the member 1, projecting thereabove and carrying the sleeve 32 for the reception of the stem 31 which is connected to the upper end of the carbid receptacle 23, said stem 31 being apertured so that a pin (not shown) may be introduced through any of the apertures above the frame 33 and thus lock the bell and the carbid receptacle in the desired elevated position during the removal of the cap 24' and the recharging of the carbid holder 23.

In order to provide an automatic means for feeding the carbid from the outlet end of the spout 29 due to the lowering of the bell 13 and to cut off the supply when the bell has been elevated to the proper distance, a pin 35 forms a pivot for the lug 34 of the swinging member 36, said member 36 being disposed to swing below and close the outlet 29 of the funnel 22 when the bell 13 is at its highest elevation or at its adjusted elevation. The lowering of the bell causes the lower end of the rod 38 to engage the bottom of the receptacle 1 and thus depresses the blade end 37 of the member 36 to open the outlet 29, the carbid therefrom being directed upon the blade 37 which in turn directs the same to and upon the screen 20 which holds the carbid until dissolution. As soon as the gas has been generated sufficiently due to the introduction of the carbid within the water of the generator, the bell 13 is elevated and the rod 38 disengaged from the lower end of the receptacle 1, so that the parts are in the position as shown. In order to render this action of the cut off member 36 adjustable, an extension end 39 is fitted upon the lower end of the rod 38, the same being preferably screw threaded so as to be readily adjusted when desired.

A filling funnel F with outlet f is provided to permit water to be supplied to the casing 1.

The screen 20 in addition to assisting in scattering the carbid, avoids the excessive generation of heat, as it suspends the carbid in the water which absorbs the heat during generation. Thus the particles finally precipitated to the bottom are small enough to pass through the drain gate 2.

The valve 28 and its rod 25 and spring 26, provide an automatic cut off which prevents the falling of carbid into the water during the filling of the holder 23.

What is claimed is:

1. An acetylene gas apparatus, including a generator, a buoyant bell disposed therein, a carbid holder carried by the bell, a screen to be submerged, and a combined sludge stirrer and support for said screen mounted for disposition within the generator carried bodily with the bell.

2. An acetylene gas apparatus, including a generator, a buoyant bell disposed therein, a carbid holder carried by the bell, a screen to be submerged, and a combined sludge stirrer and support for said screen mounted for disposition within the generator carried bodily with the bell, the connection between the same and the bell being a sliding connection of limited extensibility, whereby the sludge stirrer normally rests upon the bottom of the generator.

3. An acetylene gas apparatus, including a generator, a buoyant bell disposed therein, a carbid holder carried concentrically of the top of the bell, a screen to be submerged, a support for said screen slidably connected to the bell for disposition within the generator, the screen thereof being adapted to extend above the bottom of the generator and in line to receive the carbid emptied from the holder.

4. An acetylene gas apparatus, including a generator, a buoyant bell disposed therein, a carbid holder carried concentrically of the top of the bell, a screen to be submerged, a support for said screen slidably connected to the bell for disposition within the generator, the screen thereof being adapted to extend above the bottom of the generator and in line to receive the carbid emptied from the holder, and a sludge stirrer also connected to and carried by the bell.

5. An acetylene gas apparatus, including a generator, a buoyant bell disposed therein, a carbid holder carried by the bell, a plurality of rods slidably connected to the bell for movement below the rim thereof into the generator, a sludge stirrer connected to the lower ends of the rods for disposition upon the bottom of the generator, a screen support connected to and carried by the sludge stirrer, and a screen mounted in said support.

In testimony that I claim the foregoing as my own, I have hereto affixed my signature in the presence of two witnesses.

ERNEST M. RODEBAUGH.

Witnesses:
N. A. RODEBAUGH,
K. S. PARKER.